United States Patent [19]

Ellis et al.

[11] Patent Number: 4,721,738

[45] Date of Patent: Jan. 26, 1988

[54] POLYMERIC COMPOSITIONS INCLUDING MICROWAVE ENERGY SENSITIZING ADDITIVES

[75] Inventors: Jeffrey R. Ellis, East Windsor, N.J.; Martin B. Dines, deceased, late of Laguna Beach, Calif., by Elaine Dines, legal representative

[73] Assignee: Occidental Research Corporation, Los Angeles, Calif.

[21] Appl. No.: 785,206

[22] Filed: Oct. 7, 1985

[51] Int. Cl.$^4$ .............................................. G21F 1/10
[52] U.S. Cl. .................................... 523/137; 524/136; 524/139; 524/140; 524/141; 524/142; 524/144; 524/176; 524/177; 524/408; 524/409
[58] Field of Search ............... 523/137; 524/136, 139, 524/140, 141, 142, 144, 176, 177, 408, 409

[56] References Cited

U.S. PATENT DOCUMENTS

| | | | |
|---|---|---|---|
| 2,630,442 | 3/1953 | Church et al. | 524/141 |
| 2,743,257 | 4/1956 | Church et al. | 524/141 |
| 3,030,334 | 4/1962 | Canarios et al. | 524/141 |
| 3,647,745 | 3/1972 | Jennings | 524/140 |
| 4,011,197 | 3/1977 | Lee | 523/137 |
| 4,100,076 | 7/1978 | Ashman et al. | 524/409 |
| 4,100,077 | 7/1978 | Burt et al. | 524/409 |
| 4,360,607 | 11/1982 | Thorsrud et al. | 523/137 |

*Primary Examiner*—Lewis T. Jacobs
*Attorney, Agent, or Firm*—Robert J. Baran

[57] ABSTRACT

A composition of matter including a polymer sensitized to the heating effects of microwave energy which comprises said polymer and a microwave sensitizing amount of a particulate, layered compound comprising a tetravalent atom and a pentavalent atom, selected from the group consisting of elements of Group V of the Periodic Table of the Elements, and having an atomic weight of greater than 30, dispersed throughout said polymer.

18 Claims, No Drawings

POLYMERIC COMPOSITIONS INCLUDING MICROWAVE ENERGY SENSITIZING ADDITIVES

BACKGROUND OF THE INVENTION

1. Field of the Invention

This invention relates to polymer compositions which include additives to increase the dielectric heating efficiency of said composition. In particular, the compositions of this invention include a polymer, e.g. a polymer substantially comprised of non-polar monomers, and an additive comprising a particulate, layered compound of a tetravalent atom and a pentavalent atom, selected from Group V of the Periodic Table of the Elements, and having an atomic weight of at least 30. The particulate, layered compounds may include organo radicals, to thereby enhance the compatibility of the particulate, layered compound and the polymer. In one aspect of this invention, the polymer compositions are thermoplastic molding compositions. In another aspect of this invention a method for molding thermoplastic molding compositions using microwave energy, in the radio frequency (RF) range of the microwave spectrum, is disclosed and claimed. In still another aspect of the invention thermoplastic molding compositions are sensitized so that energy of the microwave RF frequency can be used in the molding process. In yet another aspect the invention relates to objects molded of thermoplastic molding compositions.

2. Description of the Art

It is known that microwave RF energy may be used to increase the temperature of polymer compositions comprising polar comonomers so that the temperature is raised above the softening point and molding and other thermoplastic shaping processes are possible. However, when the polymer is not comprised of polar comonomers, i.e. copolymers comprising nonpolar comonomers, polar additives must be incorporated therein to provide sensitivity to microwave RF energy. In general, polar compounds are substantially incompatible with the nonpolar hydrocarbon polymers such as polyethylene, polystyrene, polypropylene, etc. Providing microwave sensitivity e.g. RF sensitivity, to nonpolar polymers, in view of the incompatibility of nonpolar polymers, especially hydrocarbon polymers and polar additives, is thus a problem that has been sought to be solved. One solution to this problem has been the incorporation of asbestos in certain nonpolar polymers. Asbestos, however, is difficult to finely divide to the extent that it is uniformly dispersed throughout the polymer composition. In addition, asbestos is a material which has been associated with known health problems and thus it is not used in any application where it can be conveniently replaced. A clay-based product, sold under the Frequon ® trademark, has been suggested as a substitute for asbestos. (Frequon ® is marketed by Phillips Petroleum Company.) This material, while not having the health-related problems of asbestos does not have sufficient heat stability at temperatures greater than 350° F.

Thus, it would be desirable to have an additive which is compatible with nonpolar polymers and able to provide microwave, e.g. RF, sensitization to polymeric composites of the nonpolar polymer and the additive. It would also be desirable to have an additive which increases the dielectric heating efficiency across a relatively wide band of microwave radiation.

SUMMARY OF THE INVENTION

This invention provides polymer compositions which are sensitive to microwave radiation and comprise, in combination, a polymer, e.g. a nonpolar thermoplastic polymer, and an additive comprising a particulate layered compound Said additive comprises a tetravalent atom and a pentavalent atom, selected from Group V of the Periodic Table of the Elements, and having an atomic weight of at least 30. Preferably the tetravalent atom is bonded to an organo-radical, either directly, or through an oxygen atom. The organoradical(s) may be selected to enhance the compatibility of the particulate layered compound and enhance the absorption of microwave, e.g. radio frequency, or other radiation when blended with the polymer, e.g. a non-polar polymer. (The term microwave, for the purpose of the present invention, shall refer to that portion of the electro-magnetic spectrum having a frequency lower than the lowest wave length of the visible spectrum, i.e. a frequency lower than about $10^{14}$ Hz.)

DETAILED DESCRIPTION OF THE INVENTION

1. The Additive

The additive useful in preparing the microwave energy sensitive products of the instant invention will be selected from the group consisting of compounds represented by the formula $M(O_3ZO_xR)_n$. In this formula n may equal 1 or 2, except that n is 1 when R is terminated by a tri- or tetra-oxy pentavalent atom. M represents a tetravalent atom selected from the group consisting of:

| | | | | |
|---|---|---|---|---|
| Zr | Te | Pr | Mn | V |
| W | Sn | Pb | Ir | |
| U | Si | Os | Hf | |
| Ti | Ru | Nb | Ge | |
| Th | Pu | Mo | Ce | |

Z is an pentavalent atom selected from the group consisting of the members of Group V of the Periodic Table of the Elements having an atomic weight of at least 30; R is selected from the group consisting of hydrogen and organic radicals and x varies from 0 to 1. More preferably, said compound will be selected from the group consisting of the compounds represented by the general formula $M(O_3PR)_2$, or $M(O_3POR)_2$.

The above compounds may be prepared by a process which comprises reacting, in a liquid medium, at least one acid compound, i.e. an organo-substituted, pentavalent atom containing acid, having the formula $((HO_2O-ZO_x)_kR$, wherein k is 1 when n is 2 and k is 2 when n is 1, with at least one of the above tetravalent metal ions to precipitate a solid in which the molar ratio of pentavalent atom to tetravalent atom is 2 to 1, the pentavalent atom is convalently bonded to R and when x equals 1, R is linked to the pentavalent element Z through oxygen.

It should be noted that x will be 0 when the starting material for preparing the compound is represented by the general formula $((HO)_2Z)_nR$:

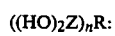

wherein n is 1 or 2, e.g., $$((HO)_2P)_nR,$$
$$\|$$
$$O$$

i.e., phosphorus acid or organophosphonic acids. When the starting material is represented by the general formula $$((HO)_2Z-O)_nR; \text{ e.g., } ((HO)_2P-O)_nR,$$

i.e., organophosphoric acids or phosphoric acid, x will be 1. If a mixture of such starting materials are used, x will vary from 0 to 1 in accordance with the ratio of the starting materials.

The tetravalent atom M and the pentavalent atom Z, may be selected in accordance with the desired properties for the active moiety by those skilled in the art. However, M is preferably Zr or Ti and Z is preferably P.

R is selected from the group consisting of hydrogen radicals, organo acyclic, alicyclic, heteroacyclic, heterocyclic, aromatic groups, and mixtures thereof. In one embodiment of this invention at least a portion of the R groups, are selected to enhance the compatibility of the layered compound in the nonpolar polymer. This selection may be conveniently be done by tailoring the layered compound, through the R groups, to obtain a solubility parameter substantially equal to the nonpolar polymer. This tailoring is similar to selecting a compatible plasticizer for the nonpolar polymer, and is within the skill of the art and should increase the dispersibility of the additive in the nonpolar polymer. At least some of the R groups are selected to provide polarity to the layered compound. The polar bonds in these R groups interact with the microwave energy to provide the heating thereof. Suitable polar bonds for such R groups include $$\text{—O—H, —S—H, —CN, —}\overset{O}{\underset{\|}{C}}\text{—, —Cl, —NH}_2 \text{ etc.}$$

Thus, preferred R groups will include hydroxyl radicals, sulfhydryl radicals, nitrile, keto, halo, amino, etc.

R is preferably chosen to enable the compound to achieve a layered structure. Thus, the size of the R may be important, since very bulky R groups may disrupt such layering.

In general, with phosphorus as the pentavalent atom, the organo group will preferably occupy no more than about 24 Å$^2$ for proper spacing. This preferable limitation is imposed by the basic crystal structure of zirconium phosphate. A spacing of 5.3 Å$^2$ is known for the space bounded by zirconium atoms. It follows that any group anchored on each available site cannot have an area much larger than the site area and maintain a layered structure.

This limitation can be avoided, however, through the use of a combination of larger and smaller groups, i.e., mixed components. If some of the sites are occupied by groups which have an area much less than about 24 Å$^2$ adjacent groups can be larger than 24 Å$^2$ and still maintain the layered structure of the compound.

The cross-sectional area which will be occupied by a given organo group can be estimated in advance of actual compound preparation by the use of CPK space filling molecular models (Ealing Company) as follows:

A model for the alkyl or aryl chain and terminal group is constructed, and it is situated on a scaled pattern of a hexagonal array with 5.3 Å site distances. The area of the group is the projection area on this plane. Some areas which have been determined by this procedure are listed in Table 1.

TABLE 1

| Moiety | Minimum Area (Å$^2$) | Moiety | Minimum Area (Å$^2$) |
|---|---|---|---|
| Alkyl chain | 15 | Isopropyl | 22.5 |
| Phenyl | 18 | t-Butyl | 25 |
| Carboxyl | 15 | Chloromethyl | 14 |
| Sulfonate | 24 | Bromoethyl | 17 |
| Nitrile | 9 | Diphenylphosphino | 50(approx) |
| Morpholinomethyl | 21 | Mercaptoethyl | 13.5 |
| Trimethylamino | 25 | | |

Note that the bulk of the above described moieties must also be included when calculating the correct R group size for attaining the preferred layered structure for the additive. Note also the wide chemical variation of suitable R groups thus enabling ease of tailoring for the purpose of obtaining microwave (e.g. RF.) sensitivity as well as compatability with nonpolar thermoplastics.

The most polar groups such as hydroxyl or mercapto are the most sensitive to microwave energy. Multiple polar groups in the sensitizer should increase sensitivity although intramolecular hydrogen bonding could decrease the overall response. Spectra of energy absorption can be taken to determine the optimum functional group for any microwave frequency of interest or for completely self contained systems, one can use a generator operating at the optimum frequency for energy absorption. However, maximum absorption response is not the main purpose of the sensitizer. The sensitizer must provide a controlled response which in an ideal situation decreases and levels off with increasing temperature.

Examples of suitable layered compounds include:
Zr(O$_3$PCH$_2$CH$_2$SH)$_2$
Zr(O$_3$PCH$_2$CH$_2$OH)$_2$
Zr(O$_3$PCH$_2$CH$_2$Cl)$_2$
Zr(O$_3$PCH2OH)$_2$
Zr(O$_3$POH)$_2$
Zr(O$_3$POCH$_2$CH$_2$OH)$_2$
Zr(O$_3$PCH$_2$CH$_2$CN)$_2$
Zr(O$_3$PC$_6$H$_4$OH)$_2$
Zr(O$_3$PCH$_2$CN)$_2$
Zr(O$_3$PC$_2$H$_4$NH$_2$)$_2$ 2. The Polymer The polymer may be a thermoplastic or a thermosetting polymer, comprised of polar or nonpolar monomers, or mixtures thereof. In one aspect of this invention the nonpolar polymer may be a nonpolar thermoplastic polymer, substantially comprised of nonpolar monomers, e.g. copolymerizable hydrocarbons, although copolymers having less than about 10 mole percent of polar monomers, e.g. vinylchloride, acrylonitrile, vinylidene chloride, vinylalcohol, etc., and the remainder nonpolar monomers, are for the purposes of this invention sufficiently nonpolar to be included as a nonpolar polymer. In another aspect of this invention polar polymers not containing the most microwave sensitive functional groups may be provided with increased useful sensitivity by incorporating one or more of the above-described additives.

The preferred nonpolar polymers are comprised of copolymerized monomers selected from the group -olefins, polyenes (especially conjugated polyenes, and mixtures thereof. Examples of suitable - olefins include: ethylene, propylene, 1-butylene, styrene, -methylstyrene, etc. Suitable polyenes include: butadiene, 1, 3 hexadiene, cyclopentadiene, cyclohexadiene, etc.

Thus the preferred nonpolar polymers are polyethylene, polystyrene, polypropylene, ethylene-propylene copolymer, terpolymers of ethylene, propylene and a polyene, styrene-butadiene copolymer, etc.

The non-polar polymer useful in practicing this invention may be normally solid linear and radial teleblock thermoplastic elastomeric copolymers which characteristically exhibit high tensile strength and elongation in their natural condition, e.g., nonvulcanized state. Particularly suitable teleblock copolymers are copolymer elastomers derived from butadiene and styrene in which the butadiene to styrene ratio can vary from about 85:15 to about 45:55 parts by weight and which contain from about 10 to about 55 weight percent of the styrene incorporated as terminal polystyrene blocks. The amount of the thermoplastic polymer employed in blends preferably constitutes from about 30 to 100 weight percent of the total polymers utilized in preparing the compositions of this invention.

Other thermoplastic polymers that may be employed in forming the compositions, that this invention comprises are generally solid resinous polymers of a vinyl-substituted aromatic compound, e.g., styrene, alpha-methyl styrene, etc., alone or copolymerized with a monomer such as a conjugated diene, e.g. butadiene.

In general, the thermoplastic elastomers and other polymers described above are the non-polar thermoplastics for which the combination of components named below provide sensitizing for dielectric heating.

Particularly preferred nonpolar polymers are polyethylene, including both high density and low density polyethylene, polypropylene, poly (butene-1) and copolymers including two or more of the monomers comprising said preferred nonpolar polymers. Other preferred polymers are polysulfones and polyesters.

All of the above non-polar polymers may be used alone or in blends with other copolymers, including non-thermoplastic copolymers, such as elastomers, i.e. natural rubber, polybutadiene, styrene-butadiene rubber, Neoprene ® rubber, etc.

3. The Polymer Composition

The polymeric compositions of this invention may comprise a major portion of the polymer, e.g. a nonpolar polymer, and a minor portion of the additive. The specific amount of the additive is determined by the sensitivity of the selected additive to microwave radiation, the ease of heating of the selected polymer, and the desired temperature and rate of heating thereof that is required. Preferably the total amount of additive utilized in the polymer compositions of the present invention ranges from 0.5 to about 20 parts by weight per 100 parts by weight of the polymer composition and more preferably from about 1 to about 10 parts by weight for reasons of economy coupled with adequate response to microwave radiation.

When it is desired to provide polymer compositions that are to be preheated by microwave radiation, e.g. RF radiation, prior to shaping, heating times employed are selected to achieve rapid softening of the compositions to moldable consistency without deleterious effects caused by local overheating. Generally, the heating times used can range from about 2 seconds to about 4 minutes. From a commercial standpoint, however, heating times ranging from about 4 to about 55 seconds are employed to obtain favorable production rates and this is a preferred range.

On the other hand, the polymer compositions of this invention may be used to provide containers which enable heating of food or other materials contained therein by the heat generated by the interaction of microwave radiation and the container. (Containers useful for the microwave heating of food will include additives that are sensitive to microwave radiation greater than about 890 Mc/sec, e.g. 915 or 2450 Mc/sec, as opposed to polymer compositions which include the above additives for sensitization to microwave RF heating. Additives for RF heating will be selected for sensitivity to radiation in the range of 1 to 200 Mc/sec preferably 20 to 110 Mc/sec. For example, since high-frequency generators are commercially available having outputs of 100 KW at 30–40 Mc/sec and 25 KW at 100 Mc/sec additives that are sensitive to radiation at 30–40 Mc/sec and 100 Mc/sec are preferred if said additives are to be used in polymer composites that are to be preheated for compression or transfer molding processes.) Containers for microwave heating of food may be in the form of envelopes or pouches or cooking ware such as bowls, dishes etc. In this application, the amount of the additive would be selected to provide sufficient microwave sensitization to enable heating to an elevated temperature, e.g. a cooking temperature, but not to a temperature at which the integrity of the container is lost. Such application may require a lower amount of additive for example from 0.5 to about 5 parts by weight per 100 parts by weight of the polymer composition. In any event, one skilled in the art may select the proper amount of additive without undue experimentation, based on his needs.

The polymer compositions of the instant invention may be prepared by techniques known in the art for preparing polymer compositions wherein a solid material is dispersed in a polymer. For example, rubber mills, sigma blade and Banbury mixers may be used to combine the particulate layered compound with the nonpolar polymer. The additive, in particulate form, may be preblended with particulized polymer, prior to processing for improved homogeneity of the resulting polymer composite. As noted above, the additive may be tailored to enhance the compatability thereof with the nonpolar polymer, therefore facile mixing is often found.

Other components may be used as additives to the polymer compositions of the present invention and in preparation thereof including odorants, colorants and fillers, e.g., silica, clay, silicates, e.g., Wollastonite, calcium carbonate, glass beads and fibers, and the like. Plasticizing agents compatible with the nonpolar polymer can be employed if desired. Examples of these include naphthenic petroleum oils, e.g., ASTM type 104A, esters of adipic acid, phthalic acid, etc. Processing aids include the metal stearates, e.g., calcium stearate, zinc stearate, silicones, natural and synthetic waxes, and the like. Antioxidants and UV stabilizers can be added as desired from suitable commercially available materials. Exemplary of these include thiodipropionic esters, e.g., dilaurylthiodipropionate, hindered phenolic antioxidants, e.g. 2,6-di-t-butyl-4-methylphenol, octadecyl [3-(3,5-di-t-butyl-4-hydroxyphenyl)]-propionate, thiodiethylene bis(3,5-di-t-butyl-4-hydroxy) hydrocinnamate, etc., and UV stabilizers such as 2(2''-hydroxy-5'-methylphenyl) benzotriazole, 2-hydroxy-4-n-octoxybenzophenone, [2,2'-thiobis(4-t-octylphenolato)]-n-butylamine-nickel(II), etc.

Finally, resin filler coupling agents, blowing agents and curing agents for thermo setting materials may be included in the polymer composites of this invention.

Generally the amounts of the various components in parts by weight per 100 parts by weight (php) thermoplastic elastomer will be as follows: filler, 10 to 600 php, plasticizing agent 0.1 to 90 php; antioxidant, 0.1 to 2 php, UV stabilizer, 0.1 to 3 php, coupling and blowing agents 0.01 to 10 php and thermoset curing agents 1 to 150 php.

When the instant polymer compositions are to be shaped by microwave energy, e.g. RF energy, the molds employed are generally constructed from low cost, relatively low strength materials including silicone rubber, polysulfide rubber, polyurethane, plaster, cast aluminum, and the like. The nature of the mold is dependent upon the molding process used. If the invention composition is placed within the mold and the entire assembly is preheated by microwave energy, it is preferred that the mold used be made of a material such as silicone rubber that has a lower dielectric loss factor than the composition of the invention. It is within the scope of this invention to preheat the composition in a low dielectric loss container such as glass or ceramic and transfer it to a mold constructed from metals and the like for the actual shaping step. Generally, the composition is placed within a silicone rubber mold, the mold top is covered with a silicone sheet or a release paper, e.g., paper or the like covered with a release agent such as a silicone, and the assembly is placed between the plates of a high frequency electrical field which form a part of commercially available molding machines. The top plate is lowered to contact the release paper covering the mold and the composition is preheated by application of microwave energy for a desired length of time. After the preheating, sufficient pressure is employed to compression mold the composition e.g., about 10 to about 200 psig (68.9–1380 kPa), for a period of time generally ranging from about 0.1 to about 10 times the preheating time. The pressure is released, the assembly is preferably placed in a separate zone for cooling the mold and contents, after which the molded article is removed. A rotary table or the like containing a plurality of molds can be employed to provide molded parts at commercially attractive rates. Separation of the heating and cooling zones speeds production and reduces consumption of power.

The following are specific examples of the instant invention. There is no intention that the scope of the instant invention be limited to the examples, since there are many variations thereon which are within the ordinary skill of the art.

EXAMPLE 1

Polyethylene (45 g) is blended with 1% and 2%, by weight, of $Zr(O_3PCH_2CH_2SH)$. These samples and a polyethylene control are processed in a Brabender mixer at 40 rpms at 160° C. After 15 minutes the samples are removed from the mixer while still hot. The samples are compression molded at 325° F. and 36 tons in a $2\frac{1}{4}'' \times 5'' \times \frac{1}{8}''$ plaque mold and the plaques are used to measure sensitivity to microwave energy in the RF region by irradiating the sample at 61–85 cm.$^{-1}$. (Unless indicated otherwise, all samples were tested for sensitivity to microwave heating by irradiation at 61–85 cm$^{-1}$ using a Thermall EO-1 RF generator and made by W. T. LaRose Associates, Cohoes, N.Y.) Minor heat absorption of the samples is noted at 130 milliamps once a threshold temperature is reached; however, as shown below at higher powers much more heat absorption is obtained.

EXAMPLE 2

Plaque samples of the formulations given in Table 1 are made up as in Example 1, except that the samples are of the dimensions $1\frac{1}{2}'' \times 2\frac{1}{2}'' \times \frac{1}{8}''$. The temperature of the samples as a function of exposure to microwave radiation is measured as follows:

Two plaques, one on top of the other, are supported on a $1\frac{1}{2}'' \times 2\frac{1}{2}'' \times \frac{1}{8}''$ aluminum plate which acts as a heat sink. The temperature of the inner surfaces of the plaques is measured with a surface pyrometer for five successive 60 second pulses.

The initial current is 370 milliamps. After each series the aluminum plate is cooled to room temperature. The results are summarized in Table 1.

TABLE 1

| Formulation | 1st °F. | 2nd °F. | 3rd °F. | 4th °F. | 5th °F. |
|---|---|---|---|---|---|
| Polyethylene (Control) | 68 | 81 | 87 | 94 | 101 |
| 2% $Zr(O_3PCH_2CH_2SH)_2$ White | 86 | 93 | 102 | 109 | 115 |
| 2% $Zr(O_3PCH_2CH_2SH)_2$ Red | 82 | 94 | 105 | 115 | 121 |
| 2% $Zr(O_3PCH_2OH)_2$ | 101 | 123 | 132 | 138 | 140 |
| 2% $Ti(O_3PC_6H_5)_2$ | 87 | 102 | 110 | 118 | 129 |
| 5% $Zr(O_3PCH_2CH_2SH)_2$ | 98 | 117 | 132 | 144 | 150 |
| Polyethylene (Control)[a] | 84 | | | | |
| 2% $Zr(O_3PCH_2CH_2SH)$ White[a] | 93 | | | | |
| 2% $Zr(O_3PCH_2CH_2SH)$ Red[a] | 80 | | | | |

[a]Samples tested again to make sure repeated residual heat build-up has no bearing on the magnitude of the sensitivity to microwave RF heating.

It is clear from the results of Table 1 that the particulate layered compounds utilized in this experiment sensitize polyethylene to microwave heating, in the RF range.

EXAMPLE 3

The samples of Table 2 are made in a Brabender plsticorder using a polyethylene as the nonpolar polymer.

Each is tested as in Example 2 and the results obtained are summarized in Table 2.

TABLE 2

| Additive | 1st °F. | 2nd °F. | 3rd °F. | 4th °F. | 5th °F. |
|---|---|---|---|---|---|
| None | 77 | 86 | 93 | 99 | 104 |
| 2% Et/CO Copolymer[b] | 88 | 118 | 138 | 150 | 156 |
| 2% Asbestos | 125 | 161(fusion) | — | — | — |
| 5% Asbestos | 144(fusion) | — | — | — | — |
| 2% $Zr(O_3PCH_2OH)_2$ | 108 | 127 | 143 | 148 | 157 |

TABLE 2-continued

| Additive | Pulse | | | | |
|---|---|---|---|---|---|
| | 1st °F. | 2nd °F. | 3rd °F. | 4th °F. | 5th °F. |
| 2% Zr(O_3PCH_2CH_2OH)_2 | 120 | 153 | 166 | 186 | 186 |
| 2% Vinylalcohol | 115 | 159 | 187 | 200 (fusion) | — |
| 4% ET/CO Copolymer | 141 | 178 | 197 | — | — |
| Repeats (see footnote $a$ above) | | | | | |
| None | 86 | 103 | 115 | 121 | 128 |
| 2% Et/CO$^b$ Copolymer | 114 | 145 | 159 | 166 | 173 |

$^b$An ethylene-carbon monoxide copolymer prepared by peroxide-catalyzed polymerization.

The sample comprising 2% $Zr(O_3PCH_2CH_2OH)_2$ is superior to the samples comprising the prior art microwave enegy sensitizers. Moreover, in addition to its safety advantage over asbestos, the current drift over a 60 second time period is very small (7%) while asbestos shows a greater than 10% current drift and premature fusion.

EXAMPLE 4

The formulation of Table 3, using a polyethylene, available from Exxon, were made in a Bradbender Plasticcorder, molded, then subjected to microwave energy as in Example 2.

TABLE 3

| Additive | Pulse | | | | |
|---|---|---|---|---|---|
| | 1st °F. | 2nd °F. | 3rd °F. | 4th °F. | 5th °F. |
| None | 97 | 107 | 125 | 137 | 144 |
| 0.5% Asbestos | 101 | 123 | 139 | 146 | 156 |
| 0.5% Zr(O_3PCH_2CHOH)_2 | 103 | 125 | 137 | 149 | 153 |
| 1.0% Asbestos | 136 | 174 | — | — | — |
| 1.0% Zr(O_3PCH_2CHOH)_2 | 117 | 142 | 150 | 162 | 164 |
| 0.75% Asbestos | 110 | 139 | 168 | 189 | — |
| 0.75% Zr(O_3PCH_2CH)_2 | 106 | 134 | 148 | 156 | 162 |
| 1.25% Zr(O_3PCH_2CH)_2 | 117 | 145 | 157 | 164 | 172 |
| 0.5% Ti(O_3PCH_2CH_2OH) | 94 | 114 | 131 | 140 | 146 |
| 0.75% Ti(O_3PCH_2CH_2OH)_2 | 98 | 116 | 127 | 136 | 143 |
| 1.0% Ti(O_3PCH_2CH_2OH)_2 | 91 | 108 | 122 | 132 | 138 |
| 1.25 Ti(O_3PCH_2CH_2OH)_2 | 98 | 122 | 135 | 144 | 151 |

Room Temperature 68° F.
Pulses are 60 seconds each at 376 milliamps

Titanium layered compounds powder more easily and may be more compatible with polyethylene than is its zirconium cogener; however the titanium layered compounds are not quite as good as zirconium - especially for pulses less than 180 seconds. Nevertheless both compositions are efficient microwave sensitizers for polyethylene. In addition, the temperature rise magnitude for successive pulses decreases whith increasing temperature of the polymer compositions of this invention as compared to the asbestos-containing polymer compositions and the polymer alone. This property is, of course, desirable and unexpected.

EXAMPLE 5

In this Example the plaques are shielded by a 1/4" Teflon ® ring. The results are summarized in Table 4 below.

TABLE 4

| Additive | Pulse | | | | | |
|---|---|---|---|---|---|---|
| | 1st | 2nd | 3rd | 4th | 5th | |
| None | 72 | 82 | 92 | 99 | 104 | ⎫ 2 Teflon |
| 0.5% Asbestos | 87 | 102 | 111 | 120 | 127 | ⎭ ring shields |
| None | 84 | 95 | 101 | 107 | 113 | ⎫ 2 Teflon |
| 2% Zr(O_3PCH_2OH) | 108 | 127 | 137 | 141 | 149 | ⎭ ring shields |
| 2% Zr(O_3PCH_2CH_2OH)_2 | 126 | 160 | 162 | — | — | |

It is hypothesized OH in that compound is less sterically hindered and can therefore vibrate more freely.

All five pulses are done sequentially. Each sequence starts at ambient temperature (72° F.) The aluminum plate is washed in water to remove heat buildup. In this experiment, the edges of the aluminum plates are rounded so that the bottom of the RF chamber won't be damaged by accidental arcing. The Teflon rings ensure that the sample plaques are affected only by direct radiation and not refracted energy.

EXAMPLE 6

The formulations of Table 5 were made and tested as in Example 5.

TABLE 5

| Additive | Pulse | | | | |
|---|---|---|---|---|---|
| | 1st °F. | 2nd °F. | 3rd °F. | 4th °F. | 5th °F. |
| None | 84 | 95 | 104 | 114 | 119 |
| 0.5% Asbestos | 99 | 114 | 125 | 130 | 137 |
| 0.75% Asbestos | 124 | 157 | 166* | — | — |
| 1.0% Asbestos | 135 | 170 | — | — | — |
| 0.5% Ti(O_3PCH_2CH_2OH)_2 | 92 | 103 | 112 | 126 | 125 |
| 0.75% Ti(O_3PCH_2CH_2OH)_2 | 97 | 111 | 120 | 127 | 131 |
| 1.0% Ti(O_3PCH_2CH_2OH)_2 | 96 | 113 | 124 | 132 | 140 |
| 1.25% Ti((O_3PCH_2CH_2OH)_2 | 99 | 113 | 124 | 130 | 137 |
| 0.5% Zr(O_3PCH_2CH_2OH)_2 | 91 | 104 | 111 | 118 | 119 |
| 0.75% Zr(O_3PCH_2CH_2OH)_2 | 106 | 124 | 137 | 142 | 149 |
| 1.0% Zr(O_3PCH_2CH_2OH)_2 | 112 | 130 | 140 | 143 | 153 |
| 1.25% Zr(O_3PCH_2CH_2OH)_2 | 112 | 128 | 142 | 149 | 155 |
| 2.0% Ti(O_3PCH_2CH_2OH)_2 | 100 | 115 | 125 | 132 | 138 |

*Sample melted

This sample demonstrates, again, that the additives of this invention are superior to the prior art asbestos additive because of the observed temperature leveling phenomenon.

EXAMPLE 7

Silica (325 mesh) and Frequon 3035 (at 2.0 percent, by weight polymer) were evaluated for their ability to impart microwave sensitization in dielectric plastics. A formulation containing 0.75% asbestos and one containing 2.0% zirconium hydroxyethylphosphonate [ZR(O$_3$PCH$_2$CH$_2$OH)$_2$] were also tested. It was found that the Frequon 3035 had a useful microwave sensitivity, but the silica did not. The sensitivity characteristics of the Frequon 3035 were further evaluated, and the results are tabulated in Tables 6 and 7. Frequon 3035 is more effective than Zr(O$_3$PCH$_2$CH$_2$OH)$_2$; however, this may be due to Frequon 3035's, generally, smaller particle size.

TABLE 6
MICROWAVE SENSITIVITIES (°F.) ONE PULSE AT 370 MILLIAMPS FOR 60 SEC. NO SHIELDING

| ADDITIVE | ROOM TEMPERATURE | TEMPERATURE AFTER ONE CYCLE |
|---|---|---|
| None | 62 | 82 |
| 2% Frequon | 64 | 163 |
| 2% Zr (O$_3$PCH$_2$CH$_2$OH)$_2$ | 65 | 122 |
| 0.75% Asbestos | 71 | 123 |
| 4% Frequon 3035 | 69 | 181 (melts) |
| 2% 325 Mesh Silica | 66 | 89 |
| 5% 325 Mesh Silica | 68 | 88 |

TABLE 7
MICROWAVE SENSITIVITIES THREE CYCLES OF 300 MILLIAMPS FOR 30 SECONDS NO SHIELDING

| ADDITIVE | ROOM TEMPERATURE | T° F. PULSE NUMBER | | |
|---|---|---|---|---|
| | | 1 | 2 | 3 |
| None | 64 | 75 | 88 | 91 |
| 1% Frequon 3035 | 67 | 93 | 111 | 124 |
| 1.5% Frequon 3035 | 67 | 105 | 129 | 145 |
| 2.0% Frequon 3035 | 65 | 116 | 160 | 195* |
| 2.0% Zr(O$_3$PCH$_2$CH$_2$OH)$_2$ | 67 | 100 | 116 | 131 |
| 0.75 Asbestos | 67 | 96 | 124 | 141 |

*Sample melted

EXAMPLE 8

Microwave sensitivity measurements were made in a polyethylene matrix on zirconium phosphate [Zr(O$_3$POH)$_2$] zirconium hydroxyethylphosphate [Zr(O$_3$POCH$_2$CH$_2$OH)$_2$], and zirconium hydroxyethylphosphonate [Zr(O$_3$PCH$_2$CH$_2$OH)$_2$], using asbestos and a matrix without any additive as reference samples. The plaques were subjected to 370 milliamps for 60 seconds each. There was no cooling to room temperature in between the various samples, and no Teflon shielding was used to prevent effects of refracted radiation from having an effect on the sample. Room temperature was 64° F. and this was true only for first pulse of control sample. The data taken are given in Table 8. The hydroxyethylphosphonate performs the best followed by the hydroxyethylphosphate and the phosphate, respectively. Sensitivity of the hydroxyethylphosphonate is of approximately the same magnitude as that of asbestos. Nytal 99 is an industrial talc from R. T. Vanderbilt, Inc. Talc is chemically similar to asbestos, and to some extent, has been used as a substitute for asbestos in some commercial applications. Obviously, this particular grade of talc is not appreciably microwave sensitive. In Table 9, the samples were shielded, as above, and allowed to equilibrate to room temperature between pulses. Otherwise the conditions were the same as in Table 9.

TABLE 8

| Additive | Pulse No. (°F.) | | | | |
|---|---|---|---|---|---|
| | 1 | 2 | 3 | 4 | 5 |
| None | 82 | 103 | 122 | 131 | 138 |
| 2% Zr (O$_3$PCH$_2$CH$_2$OH)$_2$ | 122 | 164 | — | — | — |
| 2% Nytal 99 | 94 | 112 | 130 | 142 | 150 |
| 2% Zr (O$_3$POCH$_2$CH$_2$OH)$_2$ | 106 | 140 | 157 | 175 | — |
| 2% Zr (O$_3$POH)$_2$ | 95 | 117 | 139 | 154 | 164 |
| 0.75% Asbestos | 147 | 186 | — | — | — |

TABLE 9

| Additive | Pulse No. (°F.) | | | | |
|---|---|---|---|---|---|
| | 1 | 2 | 3 | 4 | 5 |
| None | 78 | 91 | 101 | 112 | 118 |
| 2% Zr (O$_3$PCH$_2$CH$_2$OH)$_2$ | 116 | 143 | 165 | — | — |
| 2% Nytal 99 | 83 | 97 | 110 | 118 | 127 |
| 2% Zr (O$_3$POCH$_2$CH$_2$OH)$_2$ | 98 | 127 | 139 | 151 | 163 |
| 2% Zr (O$_3$POH)$_2$ | 92 | 110 | 124 | 134 | 138 |
| 0.75% Asbestos | 116 | 158 | — | — | — |

While particular embodiments of the invention have been described, it will be understood, of course, that the invention is not limited thereto since many obvious modifications can be made and it is intended to include within this invention any such modifications as will fall within the scope of the appended claims.

What is claimed is:

1. A composition of matter including a polymer sensitized to the heating effects of microwave energy which comprises said polymer and microwave sensitizing amount of a particulate, layered compound represented by the general formula: M(O$_3$ZO$_x$R)$_n$ wherein M is, selected from the group consisting of Zr, W, U, Ti, Th, Te, Sn, Si, Ru, Pu, V, Pr, Pb, Os, Nb, Mo, Mn, Ir, Hf, Ge, Ce and mixtures thereof; Z is selected from the group consisting of elements of Group V of the Periodic Table of the Elements, and having an atomic weight of greater than 30; x varies from 0 to 1; R is selected from the group consisting of hydrogen and organo radicals and n is 1 or 2, provided that n is 1 when R is terminated with a tri-or tetraoxy pentavalent atom, dispersed throughout said polymer.

2. The composition of claim 1 wherein Z is P.

3. The composition of claim 2 wherein at least a portion of said R groups have a polar bond.

4. The composition of claim 3 wherein said polar bond is selected from the group consisting of hydroxyl and sulfhydryl bonds.

5. The composition of claim 3 wherein M is selected from the group consisting of Zr and Ti.

6. The composition of claim 1 wherein said polymer is a nonpolar thermoplastic polymer.

7. The composition of claim 6 wherein said nonpolar thermoplastic polymer is selected from the group consisting of polyethylene, polypropylene, ethylene-propylene copolymers, terpolymers of ethylene, propylene and a polyene, and styrene-butadiene copolymers.

8. The composition of claim 1 wherein said particulate layered compound is selected from the group consisting of Zr(O$_3$PCH$_2$CH$_2$SH)$_2$, Zr(O$_3$PCH$_2$CH$_2$OH)$_2$, Zr(O$_3$POCH$_2$CH$_2$OH)$_2$, Zr(O$_3$POH)$_2$, and Zr(O$_3$PCH$_2$OH)$_2$.

9. A method for molding polymer compositions by use of microwave energy which comprises:
(a) incorporating a microwave sensitivity-increasing amount of a particulate, layered represented by the general formula: M(O$_3$ZO$_x$R)$_n$ wherein M is selected from the group consisting of Zr, W, U, Ti, Th, Te, Sn, Si, Ru, Pu, V, Pr, Pb, Os, Nb, Mo, Mn, Ir, Hf, Ge, Ce and mixtures thereof; Z is selected from the group consisting of elements of Group V of the Periodic Table of the Elements, and having an atomic weight of greater than 30; x varies from 0 to 1, R is selected from the group consisting of hydrogen and organo radicals, and n is 1 or 2; provided that n is 1 when R is terminated with a tri-or tetraoxy pentavalent atom into a polymer to provide a polymer composition.

(b) subjecting said polymer composition to microwave energy for a time and at an intensity sufficient to raise the temperature of said polymer composition and thereby soften said polymer composition;

(c) molding said softened polymer composition into a desired shape; and (d) allowing said molded polymer composition to cool while maintaining said desired shape.

10. The method of claim 9 wherein Z is P.

11. The method of claim 10 wherein at least a portion of said R groups have a polar bond.

12. The method of claim 11 wherein said polar bond is selected from the group consisting of hydroxyl and sulfhydryl bonds.

13. The method of claim 11 wherein M is selected from the group consisting of Zr and Ti.

14. The method of claim 9 wherein said polymer is a nonpolar thermoplastic polymer.

15. The method of claim 14 wherein said nonpolar thermoplastic polymer is selected from the group consisting of polyethylene, polypropylene, ethylene-propylene copolymers, terpolymers of ethylene, propylene and a polyene, and styrene-butadiene copolymers.

16. The method of claim 9 wherein said particulate layered compound is selected from the group consisting of $Zr(O_3PCH_2CH_2SH)_2$, $Zr(O_3PCH_2CH_2OH)_2$, $Zr(O_3POCH_2CH_2OH)_2$, $Zr(O_3POH)_2$, and $Zr(O_3PCH_2OH)_2$.

17. The method of claim 9 wherein said polymer composition is subjected to microwave energy within the range of 20 to 110 Mc/sec. for a time of from about 4 to about 55 seconds.

18. A container for the microwave heating of food which comprises the composition of matter of claim 1.

* * * * *